(12) United States Patent
Shiiyama et al.

(10) Patent No.: US 6,647,157 B1
(45) Date of Patent: Nov. 11, 2003

(54) IMAGE SEARCH APPARATUS AND METHOD

(75) Inventors: Hirotaka Shiiyama, Kawasaki (JP); Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 09/621,682

(22) Filed: Jul. 21, 2000

(30) Foreign Application Priority Data

Jul. 27, 1999 (JP) .......................................... 11-212711

(51) Int. Cl.[7] .................................................. G06K 9/54
(52) U.S. Cl. ...................... 382/305; 382/191; 382/209; 358/403; 707/6
(58) Field of Search .................................. 382/115, 159, 382/165, 169, 170, 173, 181, 190, 191, 192, 195, 197, 205, 209, 213, 216, 217, 218, 224, 276, 280, 305; 358/403; 707/1–10

(56) References Cited

U.S. PATENT DOCUMENTS

| | | | | |
|---|---|---|---|---|
| 5,274,714 A | * | 12/1993 | Hutcheson et al. | 382/157 |
| 5,465,308 A | * | 11/1995 | Hutcheson et al. | 382/159 |
| 5,917,940 A | * | 6/1999 | Okajima et al. | 382/173 |
| 6,067,369 A | * | 5/2000 | Kamei | 382/125 |
| 6,243,492 B1 | * | 6/2001 | Kamei | 382/181 |

OTHER PUBLICATIONS

Kjell "Comparative study of noise–tolerant texture classification", IEEE, pp. 2431–2436, 1994.*

"Computer Description of Textured Surfaces", R. Boacsy, Proc. 3rd Int. conf. On Artificial Intelligence, pp. 572–579, 1973.

* cited by examiner

Primary Examiner—Daniel G. Mariam
(74) Attorney, Agent, or Firm—Fitzpatrick, Cella, Harper & Scinto

(57) ABSTRACT

The two-dimensional power spectrum of an input image, which is obtained by computing its two-dimensional Fourier transform, is segmented into a plurality of blocks (5×5) on the two-dimensional coordinate system, and the standard deviations of power spectrum components of blocks (5×3) of interest of those segmented blocks are computed. By masking the computed standard deviations in units of blocks (matrix of standard deviations) using predetermined mask patterns prepared in units of directions of interest, the sums of the standard deviations are computed as feature amounts in units of directions, and the directionality of the input image is determined based on the feature amounts. The feature amounts computed for the input image and the directionality determination result are stored in correspondence with each other, and a similar image search is made using the stored information.

24 Claims, 10 Drawing Sheets

FIG. 3

| IMAGE ID | FULL-PASS FILE NAME | FEATURE AMOUNT | DIRECTIONALITY ID | ANOTHER IMAGE ATTRIBUTE |

FIG. 6A

| 0 | 0 | 0 | 0 | 0 |
|---|---|---|---|---|
| 1 | 0 | 0 | 0 | 1 |
| 0 | 0 | 0 | 2 | 2 |

MASK OF 0° DIRECTION

FIG. 6B

| 0 | 0 | 0 | 1 | 2 |
|---|---|---|---|---|
| 0 | 0 | 0 | 2 | 1 |
| 0 | 0 | 0 | 0 | 0 |

MASK OF 45° DIRECTION

FIG. 6C

| 0 | 1 | 2 | 1 | 0 |
|---|---|---|---|---|
| 0 | 0 | 2 | 0 | 0 |
| 0 | 0 | 0 | 0 | 0 |

MASK OF 90° DIRECTION

FIG. 6D

| 2 | 1 | 0 | 0 | 0 |
|---|---|---|---|---|
| 1 | 2 | 0 | 0 | 0 |
| 0 | 0 | 0 | 0 | 0 |

MASK OF 135° DIRECTION

FIG. 10

| | |
|---|---|
| 0° | 1, 4, 5, 10 |
| 45° | 2, 13, 14 |
| 90° | 3, 4, 10 |
| 135° | 12, 15 |

IMAGE SEARCH APPARATUS AND METHOD

FIELD OF THE INVENTION

The present invention relates to an image search apparatus and method for searching for a desired image (image data), and a computer readable storage medium.

BACKGROUND OF THE INVENTION

Conventionally, various techniques for searching for image data of similar images (to be simply referred to as images hereinafter) have been proposed. Especially for a texture image, a scheme that uses Fourier transformation in extraction of features of the texture image is known (R. Bajcsy, "Computer description of Textured Surfaces", Proc. 3rd Int. Conf. on Artificial Intelligence, pp. 572–579, 1973), and an image search apparatus that uses this scheme can be proposed.

The feature extraction method of a texture image using Fourier transformation will be briefly explained below. In this scheme, the two-dimensional Fourier transform of an input image $f(x, y)$ is computed by:

$$F(i, j) = \sum_{x=1}^{n} \sum_{y=1}^{n} f(x, y) e^{-2\pi\sqrt{-1}(ix+jy)/n} \quad (1)$$

and, a power spectrum p that indicates the magnitude of the frequency component of the image f is computed by:

$$p(i, j) = |F(i, j)|^2 \quad (2)$$

(where i and j are natural numbers (the same applies to the following description))

At this time, the power spectrum p which indicates the magnitude of the frequency component of the image f and is computed by equation (2) is adjusted so that zero frequency matches the center of spectrum, by replacing the first and third quadrants, and the second and fourth quadrants in the four quadrants of the two-dimensional coordinate system which includes the image $f(x, y)$, and is defined by orthogonal X- and Y-axes.

When the power spectrum p' that has been adjusted as described above undergoes polar coordinate conversion, a sum total $p(r)$ of components the frequency of which is r, and a sum total $p(\theta)$ of frequency components in the θ direction are respectively computed by:

$$p(r) = \sum_{i=0}^{n-1} \sum_{j=0}^{n-1} p(i, j), \quad i^2 + j^2 = r^2 \quad (3)$$

$$p(\theta) = \sum_{i=0}^{n-1} \sum_{j=0}^{n-1} p(i, j), \quad \tan^{-1}(j/i) = \theta \quad (4)$$

(where r is the distance from the origin, and θ is the angle the polar axis of the polar coordinate system makes with r (the same applies to the following description))

According to the distribution of $p(\theta)$ computed by equations (4), the directionality of texture of the image $f(x, y)$ can be determined. This directionality recognition exploits the fact that if the input image has directionality θ, a peak appears on the power spectrum at the angle θ.

The number of peaks included in this power spectrum and their magnitudes are detected, and as a result of detection, if the number of peaks is 1, "unidirectionality" is determined, if the number of peaks is 2, "bidirectionality" is determined, and if three or more peaks are included, "no directionality" is determined.

However, upon applying the aforementioned feature extraction method to image search, the following problems remain unsolved.

(1) Directionality determination based on peak detection cannot be done unless the sum total for the entire space of the power spectrum p is computed, as indicated by equations (4). For this reason, the time required for automatic computations using an apparatus such as a computer is problematic, and an apparatus having high computation processing capability to some extent must be adopted, resulting in high total cost.

(2) When similarity between two input images is determined by comparing the directionalities of the two images, a method of normalizing the distributions of power spectra of the two images, and comparing the power spectra of the two images after normalization may be normally used. In this case, the same problem as in (1) is posed, resulting in poor practicality.

(3) Even when an input image has three or more directionalities in practice as a result of determining its directionality, "no directionality" is determined, as described above.

SUMMARY OF THE INVENTION

The present invention has been made in consideration of the aforementioned problems, and has as its object to provide an image search apparatus and method, which accurately search for an image with high precision within a practical required time, and a computer readable storage medium.

In order to achieve the above object, an image search apparatus according to the present invention is characterized by the following arrangement.

That is, an image search apparatus comprises power spectrum computation means for computing a two-dimensional power spectrum of an input image by computing a two-dimensional Fourier transform of the image, standard deviation matrix generation means for segmenting the two-dimensional power spectrum computed by the power spectrum computation means into a plurality of blocks on a two-dimensional coordinate system, computing standard deviations of power spectrum components in units of blocks, and generating a matrix of the generated standard deviations, feature amount computation means for computing sums of the standard deviations as feature amounts in units of directions by making the matrix generated by the standard deviation matrix generation means using predetermined mask patterns which are prepared in advance in units of directions of interest and correspond to a pattern of the matrix, feature determination means for determining a directionality of the image on the basis of the feature amounts computed by the feature amount computation means, storage means for classifying and storing the image and the feature amounts computed by the feature amount computation means on the basis of the directionality determination result of the feature determination means, and image search means for searching for a similar image on the basis of the feature amounts and determination result stored in the storage means.

For example, the standard deviation matrix generation means generates the matrix of the standard deviations for blocks corresponding to first and second quadrants of the two-dimensional coordinate system of the plurality of segmented blocks.

For example, the mask patterns in units of directions of interest are multi-valued masks which are weighted to have the directions of interest thereof as peaks.

For example, the image search means computes a similarity between a query image designated as a query and another image by considering, as vectors, feature amounts which are stored in the storage means in correspondence with the query image and the other image as a similar image candidate, and are computed in units of directions of interest, and computing an inner product of the vectors.

In order to achieve the above object, an image search method according to the present invention is characterized by the following arrangement.

That is, an image search method comprises the power spectrum computation step of computing a two-dimensional power spectrum of an input image by computing a two-dimensional Fourier transform of the image, the standard deviation matrix generation step of segmenting the two-dimensional power spectrum computed in the power spectrum computation step into a plurality of blocks on a two-dimensional coordinate system, computing standard deviations of power spectrum components in units of blocks, and generating a matrix of the generated standard deviations, the feature amount computation step of computing sums of the standard deviations as feature amounts in units of directions by making the matrix generated in the standard deviation matrix generation step using predetermined mask patterns which are prepared in advance in units of directions of interest and correspond to a pattern of the matrix, the feature determination step of determining a directionality of the image on the basis of the feature amounts computed in the feature amount computation step, the storage step of classifying and storing the image and the feature amounts computed by the feature amount computation step on the basis of the directionality determination result in the feature determination step, and the image search step of searching for a similar image on the basis of the feature amounts and determination result stored in the storage step.

Furthermore, a computer readable storage medium is characterized by storing a program code that implements the aforementioned image search apparatus and method using a computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 shows an example of the data format of an image management DB record;

FIGS. 6A to 6D show mask patterns used to extract the feature amount of directionality in the embodiment of the present invention;

FIG. 10 shows an example of a directionality classification table; and

DETAILED DESCRIPTION OF THE PREFERRED EMBODIMENTS

An embodiment of an image search apparatus according to the present invention will be described in detail hereinafter with reference to the accompanying drawings.

Figure 1:
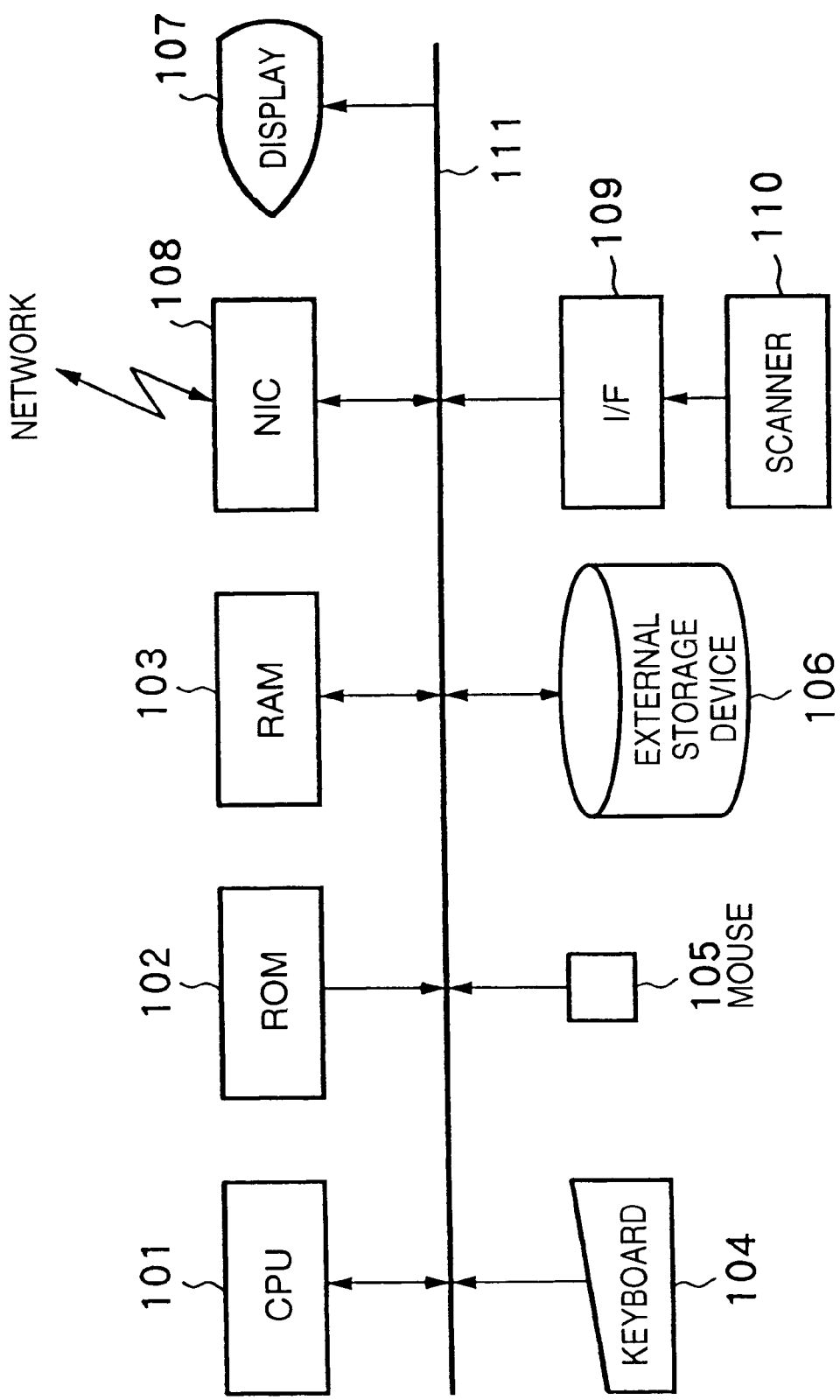
FIG. 1 is a block diagram showing the apparatus arrangement of an image search apparatus according to an embodiment of the present invention.

FIG. 1 is a block diagram showing the apparatus arrangement of an image search apparatus in this embodiment.

Referring to FIG. 1, reference numeral 101 denotes a CPU, which executes various kinds of control of the image search apparatus according to this embodiment. Reference numeral 102 denotes a ROM which stores a boot program executed by the CPU 101 upon starting the image search apparatus according to this embodiment, and various data. Reference numeral 103 denotes a RAM which stores various control programs processed by the CPU 101, and provides a work area used when the CPU 101 executes these control programs. Reference numeral 104 denotes a keyboard as an input device. Reference numeral 105 denotes a mouse as an auxiliary input device. The keyboard 104 and mouse 105 provides an input operation environment to the image search apparatus for the user.

Reference numeral 106 denotes an external storage device, which comprises a hard disk, a floppy disk drive, a CD-ROM, or the like. Reference numeral 107 denotes a display such as a CRT or the like, which displays various kinds of information as a man-machine interface. Reference numeral 108 denotes a network interface which allows communications with an external apparatus on the network. Reference numeral 110 denotes a conventional scanner for generating image data that represents an original image by scanning the original image. Reference numeral 110 denotes an interface for controlling data exchange between the scanner 110 and the image search apparatus.

The aforementioned units are connected via an internal bus 111. In the above arrangement, the scanner 110 and external storage device 106 may use those on the network.

Figure 2:
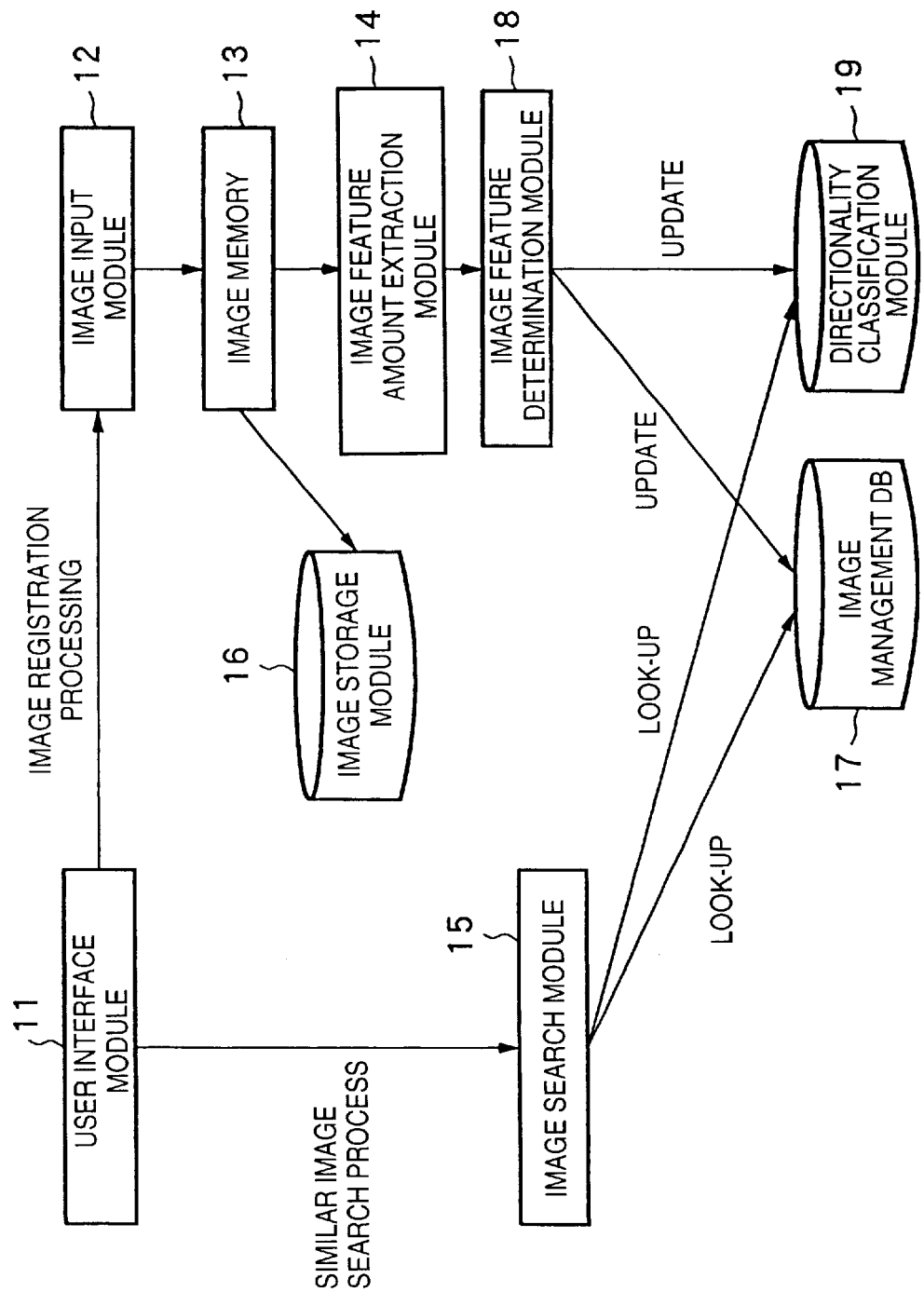
FIG. 2 is a block diagram showing the functional arrangement of the image search apparatus according to the embodiment of the present invention.

FIG. 2 is a block diagram showing the functional arrangement of the image search apparatus in this embodiment. In the following description, a module is a function unit for implementing a given function, and means a group of software programs to be executed by the CPU 101 or dedicated hardware that executes the function unit.

Referring to FIG. 2, reference numeral 11 denotes a user interface module which detects various operation inputs from the user using the display 107, keyboard 104, and mouse 105. Reference numeral 12 denotes an image input module for scanning an image using the scanner 110 and the like. Reference numeral 13 denotes an image memory which stores image data obtained by the image input module 12 on a predetermined area of the RAM 103.

Reference numeral 14 denotes an image feature extraction module for extracting the feature amount of an image f(x, y)

stored in the image memory 13 in a sequence to be described later. Reference numeral 18 denotes an image feature determination module for determining directionality on the basis of the feature amount. Reference numeral 15 denotes an image search module for computing similarities R between an image used as a query (query image) and other database images by matching the feature amounts of a plurality of types of images pre-stored in an image storage module 16, and the feature amount of the query image.

Reference numeral 16 denotes an image storage module for storing image data obtained by the image input module 12 and the like. Reference numeral 17 denotes an image management database (to be referred to as an image management DB hereinafter) for managing image data stored in the image storage module 16 in accordance with the data format shown in, e.g., FIG. 3. In the example shown in FIG. 3, the data format includes, using an image ID as a key, a file name field that represents the storage location of an image (image data file) to be stored using the full path from a predetermined root directory, and fields of a feature amount, directionality ID, and other attributes of that image.

Figure 10:
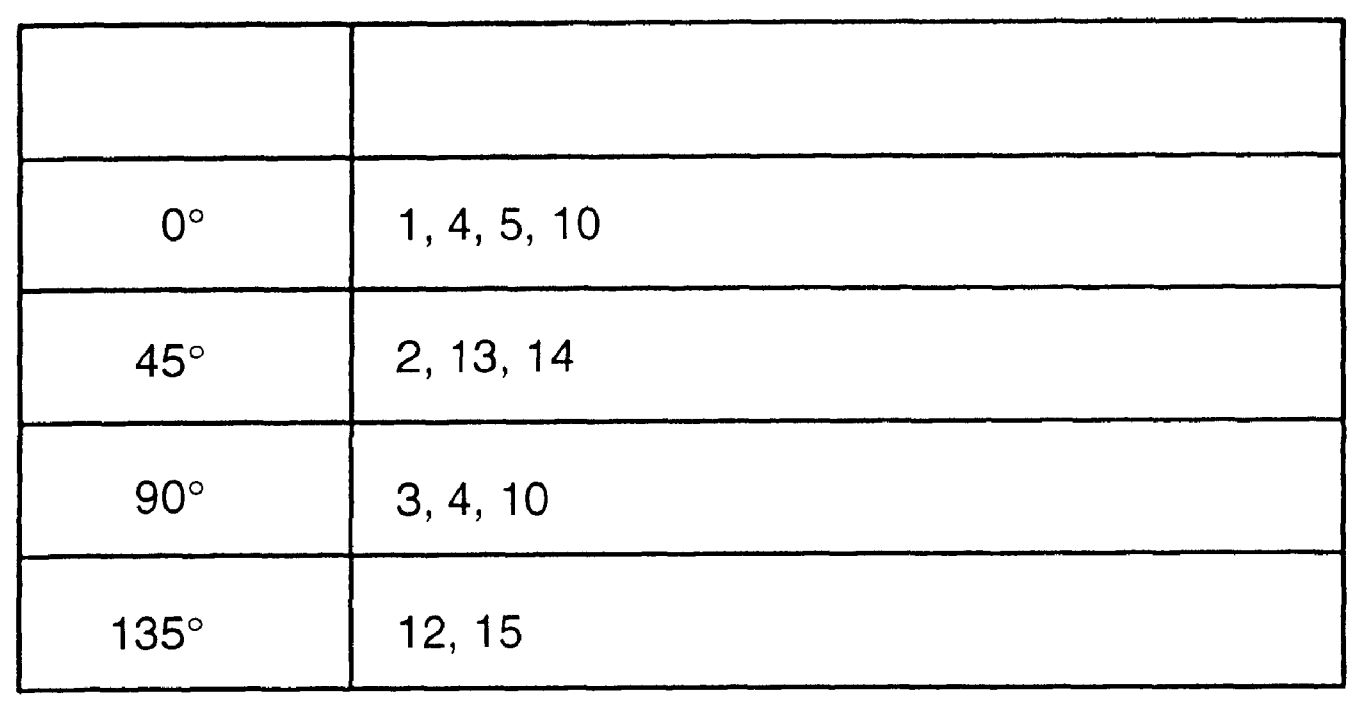

Reference numeral 19 denotes a directionality classification table which classifies and manages the image IDs using a table shown in, e.g., FIG. 10, in accordance with the directionality determined by the image feature determination module 18. This table is pre-stored in the ROM 102 or external storage device 106.

An example of the operation of the image search apparatus with the above arrangement according to this embodiment will be explained below.

Image Registration Process

A process executed upon registering an image in the image search apparatus according to this embodiment will be explained first.

Figure 4:
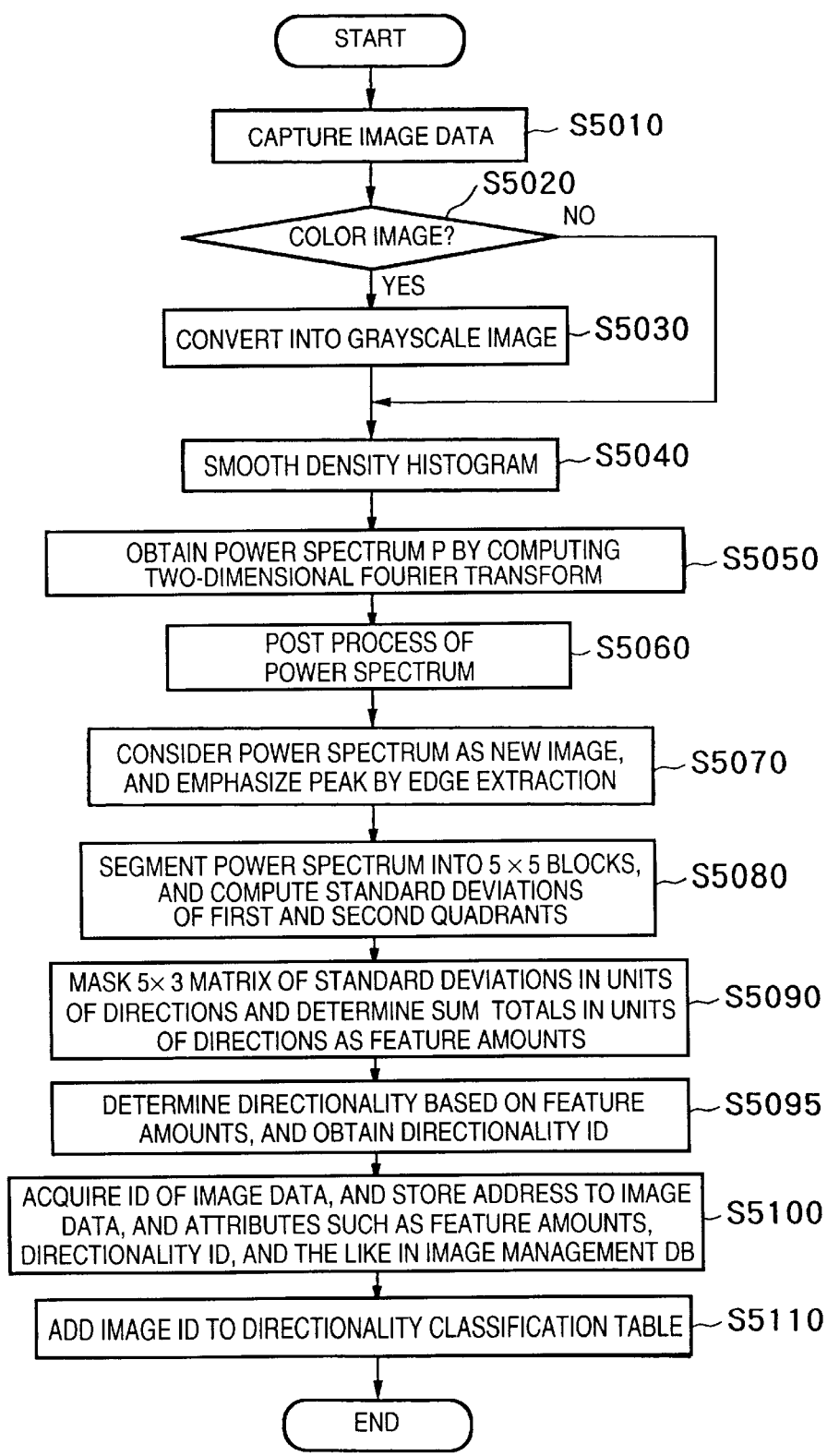
FIG. 4 is a flow chart showing the sequence of an image registration process in the embodiment of the present invention.

FIG. 4 is a flow chart showing the sequence of the image registration process in this embodiment, and shows control executed by the CPU 101.

Step S5010 in FIG. 4: An original image is captured as image data f(x, y) using the image input module 12 in accordance with the user's instruction input via the user interface module 11, and the captured image f is stored in the image memory 13.

Step S5020: The image feature extraction module 14 checks by referring to the image memory 13 if the image stored in that memory in step S5010 is a color image. If YES (color image) in step S5020, the flow advances to step S5030; if NO (grayscale image) in step S5020, the flow jumps to step S5040.

Step S5030: The color image stored in the image memory 13 is converted into a grayscale image. That is, the color image is converted into a grayscale signal (Y) by substituting, in units of pixels, R (red), G (green), and B (blue) values of multi-valued image data that represent a plurality of pixels which form the color image in:

$$Y = 0.3R + 0.59G + 0.11B \qquad (5)$$

Step S5040: In order to emphasize the contrast of the grayscale image acquired in step S5030, a density histogram is smoothed.

In this process, a histogram of density values of pixels that form the grayscale image is computed, and the computed histogram, i.e., the density values of the pixels are converted so as to have nearly constant histogram levels (pixels corresponding to the density values) at all density values.

Step S5050: The two-dimensional Fourier transform of the grayscale image obtained in step S5040 is computed to obtain a power spectrum p. The two-dimensional Fourier transform can be computed using equations (1) and (2), as described in the prior art.

Step S5060: The computed power spectrum p undergoes a post-process, i.e., a low-pass filter process to remove noise, and the like.

Step S5070: A power spectrum p' that has undergone the low-pass filter process in step S5060 undergoes an edge extraction process as a new image to emphasize peaks that appear in that power spectrum p'. This process can use, e.g., a method of filtering using a Sobel operator, or the like.

Figure 5:
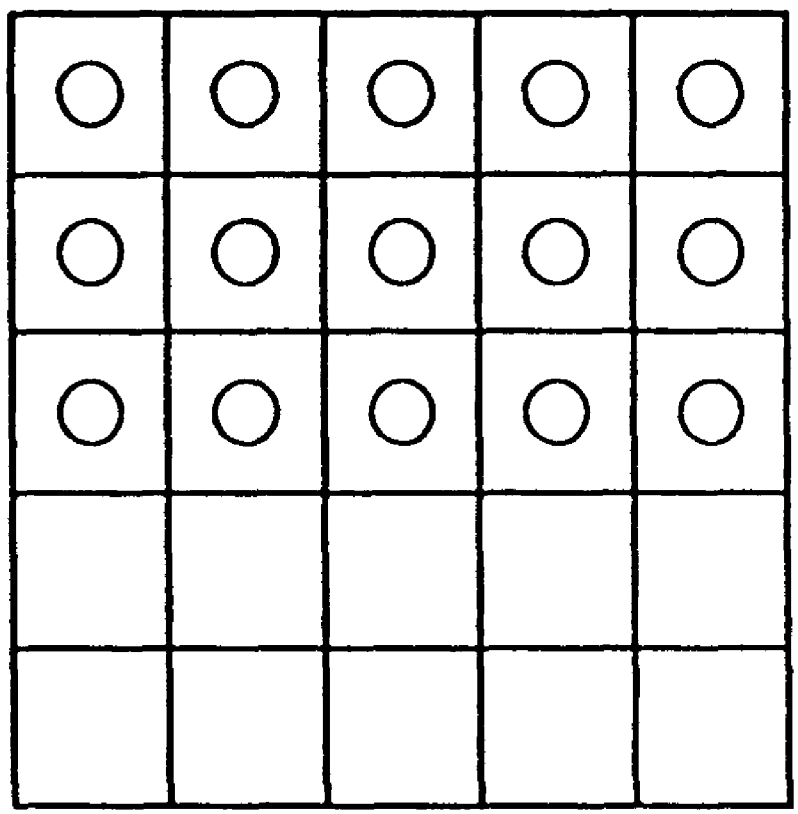
FIG. 5 shows an example of a power spectrum image segmented into blocks.

Step S5080: A power spectrum p" whose peaks have been emphasized in step S5070 is segmented into a plurality of (5×5) blocks, as shown in FIG. 5.

The reason why the power spectrum is segmented into 5×5 blocks is to recognize four directionalities as those of an image of interest, i.e., 0°, 45°, 90°, and 135° directions in this embodiment, for the sake of simplicity. In order to recognize more than four directionalities, the power spectrum can be segmented into a larger number of blocks. For example, in order to recognize eight directions, the power spectrum is preferably segmented into 13×13 blocks.

In this embodiment, the image f(x, y) is included in a two-dimensional coordinate system defined by the X- and Y-axes which are perpendicular to each other. A peak included in the power spectrum, which represents the directionality of the input image f(x, y), is expressed by a line that passes through the origin in the two-dimensional coordinate system.

For this reason, only the first and second quadrants of the four quadrants of the two-dimensional coordinate system are taken into consideration, and standard deviations of the power spectrum of the image f(x, y) present in these first and second quadrants are computed. At this time, if the time required for the process can be ignored, computations may be made for all the blocks. However, since the 0° direction is distributed on the X-axis, the time required for the computation process can be shortened, as will be described below.

That is, 5×3 blocks indicated by circular marks in the 5×5 blocks shown in FIG. 5 are taken into consideration, and the standard deviations of power spectrum components are computed for each of these blocks.

Since the standard deviation is a value that represents the degree (level) of dispersion relative to the average value of sample data, if the deviation distribution is offset due to the presence of a peak in a given block, the standard deviation assumes a large value due to the influence of such offset.

Hence, if a block having a sufficiently large standard deviation is found, it is determined that the block includes a peak of the power spectrum.

Step S5090: A matrix of the computed standard deviations of the 5×3 blocks undergoes masking using multi-valued mask patterns corresponding to four directionalities (0°, 45°, 90°, 135°) to be recognized in this embodiment, as shown in FIGS. 6A to 6D, thus computing feature amounts in units of directions.

Figure 7:
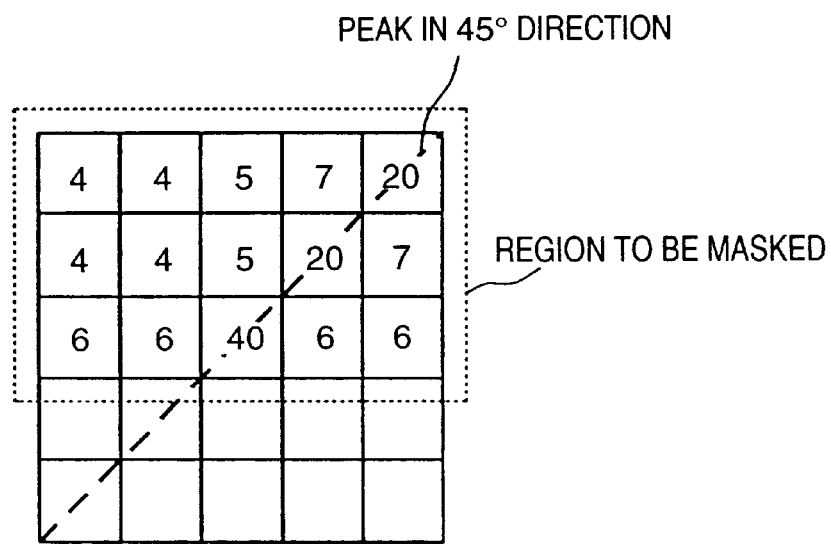
FIG. 7 shows an example of standard deviations of power spectra computed in units of blocks upon executing a processing using a mask pattern.

A case will be exemplified below wherein the standard deviations of the power spectrum of the 5×3 blocks computed in step S5080 have a peak along the dotted line shown in, e.g., FIG. 7, i.e., the power spectrum has a 45° directionality.

At this time, when masking is done using the mask pattern of, e.g., the 45° direction (FIG. 6B) of the four masks shown in FIGS. 6A to 6D, the sum of the standard deviations in units of blocks is computed, and the computed value is determined to be the feature amount in the 45° direction. In case of the blocks shown in FIG. 7, the computed feature amount in the 45° direction is:

7×1+20×2+20×2+7×1=94

When similar feature amount computations are made using the mask patterns of the respective directions shown in FIGS. 6A, 6C, and 6D, 35, 31, and 24 are respectively obtained as the feature amounts in the 0°, 90°, and 135° directions. In this case, since the feature amount in the 45° direction has the largest value among those in the four directions computed, it is determined that the standard deviations of the power spectrum shown in FIG. 7 "has a strong directionality in the 45° direction".

The direction-dependent mask patterns shown in FIGS. 6A to 6D will be described in more detail below (note that the patterns shown in FIGS. 6A to 6D are examples, and the present invention is not limited to such specific patterns as long as the feature amounts can be efficiently detected).

In all the four mask patterns shown in FIGS. 6A to 6D, a block corresponding to the intersection (origin) of the X- and Y-axes that define the two-dimensional coordinate system of the 5×3 blocks is set at "0". This is not to evaluate that block since a high peak is always observed around the origin.

In the four mask patterns shown in FIGS. 6A to 6D, blocks corresponding to the directions in which peaks appear are set to have a weight=2, and blocks that neighbor those blocks are set to have a weight=1, so that the mask for feature amount detection has a slight directionality margin. The reason why this embodiment adopts the direction-dependent mask patterns which are weighted, as shown in FIGS. 6A to 6D, will be explained below with reference to FIG. 8.

Peak [2] located within the range between peak [1] in the 45° direction and peak [3] in the 90° direction will be examined below.

Peak [2] passes through block B if it is close to peak [1] in the 45° direction or passes through block A if it is located at approximately the middle position between peak [1] and peak [3] in the 90° direction.

Figure 8:
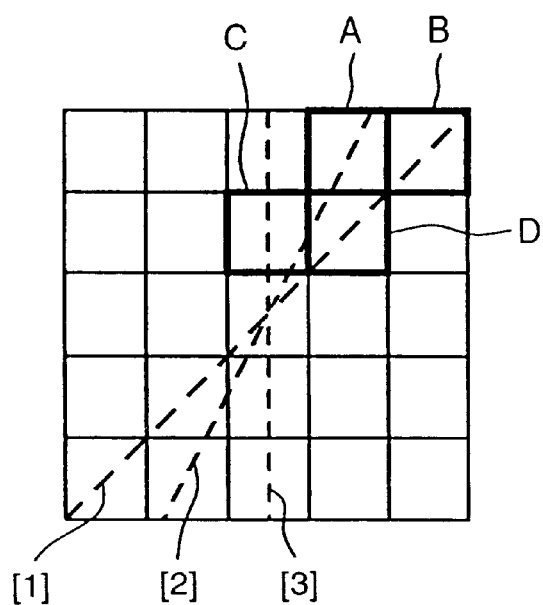
FIG. 8 is a view for explaining the way the mask pattern works when peaks indicating directionality appear at 45°, 90°, and the angle therebetween.

In the mask pattern of the 45° direction shown in FIG. 6B, since a block corresponding to block A in FIG. 8 is set to have a weight=1 and that corresponding to block B is set to have a weight=2, the feature amount after masking assumes a larger value when peak [2] is closer to the 45° direction, if the peak strength remains the same.

Conversely, if blocks corresponding to both blocks A and B in that mask pattern are set to have a weight=1, the computed sum as the feature amount assumes the same value even when peak [2] has a directionality very close to the 45° direction or even when it has a directionality slightly separated from 45°, and these two cases cannot be distinguished from each other. On the other hand, when blocks such as block A, which are set to have a weight=1, are set to have a weight=0 without providing any directionality margin to the mask pattern, the directionality of a peak slightly separated from 45° has an extremely small feature amount.

To combat such shortcomings, when the mask patterns are set, as shown in FIGS. 6A to 6D of this embodiment, the directionality can be accurately determined even in such case.

In this embodiment, when peak [2] passes near the middle position between peaks [1] and [3], since the area that peak [2] passes through block C increases as peak [2] is closer to peak [3], the feature amount in the 90° direction becomes slightly larger than that in the 45° direction. On the contrary, since the area that peak [2] passes through block D increases as peak [2] is closer to peak [1], the feature amount in the 45° direction becomes slightly larger than that in the 90° direction. In this manner, when the peak has a middle directionality, its feature amount can be reflected in those of two directionalities of interest near that peak.

Furthermore, in this embodiment, the sum totals of weights of the respective mask patterns are set to be equal to each other. This is to prevent a feature amount difference from being generated among directions. Hence, as for the 0° direction, blocks to be located in the fourth quadrant are used in those of the second quadrant located at a symmetrical position about the origin.

Step S5095: One of the four directions to be recognized in this embodiment to which the current image of interest can be classified is determined on the basis of the feature amounts in the respective directions computed in step S5090. That is, one of the four directionality regions to be recognized in this embodiment to which the peak of the power spectrum computed for the current image of interest belongs is determined.

If it is determined that the image has a 45° directionality, a directionality ID "45°" is assigned to that image; if it is determined that the image has no directionality, a directionality ID "no directionality" is assigned thereto (details will be explained later).

Step S5100: The feature amounts in units of directions (four directions in this embodiment), directionality ID, and image data obtained by the processes up to step S5095 are stored in the image storage module 16 and image management DB 17.

That is, the image data captured in step S5010 is stored in the image storage module 16. By assigning an image ID in correspondence with the image data stored in the image storage module 16, an image management DB record shown in FIG. 3 is generated, and the generated record is registered in the image management DB 17.

Step S5110: For the image whose image ID, directionality ID, and the like are registered in step S5100, its image ID is registered in the directionality classification table 19 using its-directionality ID as a key (see FIG. 10). This step is skipped for an image (image ID) assigned the directionality ID "no directionality" in step S5095.

(Directionality Determination Process)

The sequence of the directionality determination process in step S5095 in FIG. 4 will be described in detail below using the flow chart shown in FIG. 11.

Figure 11:
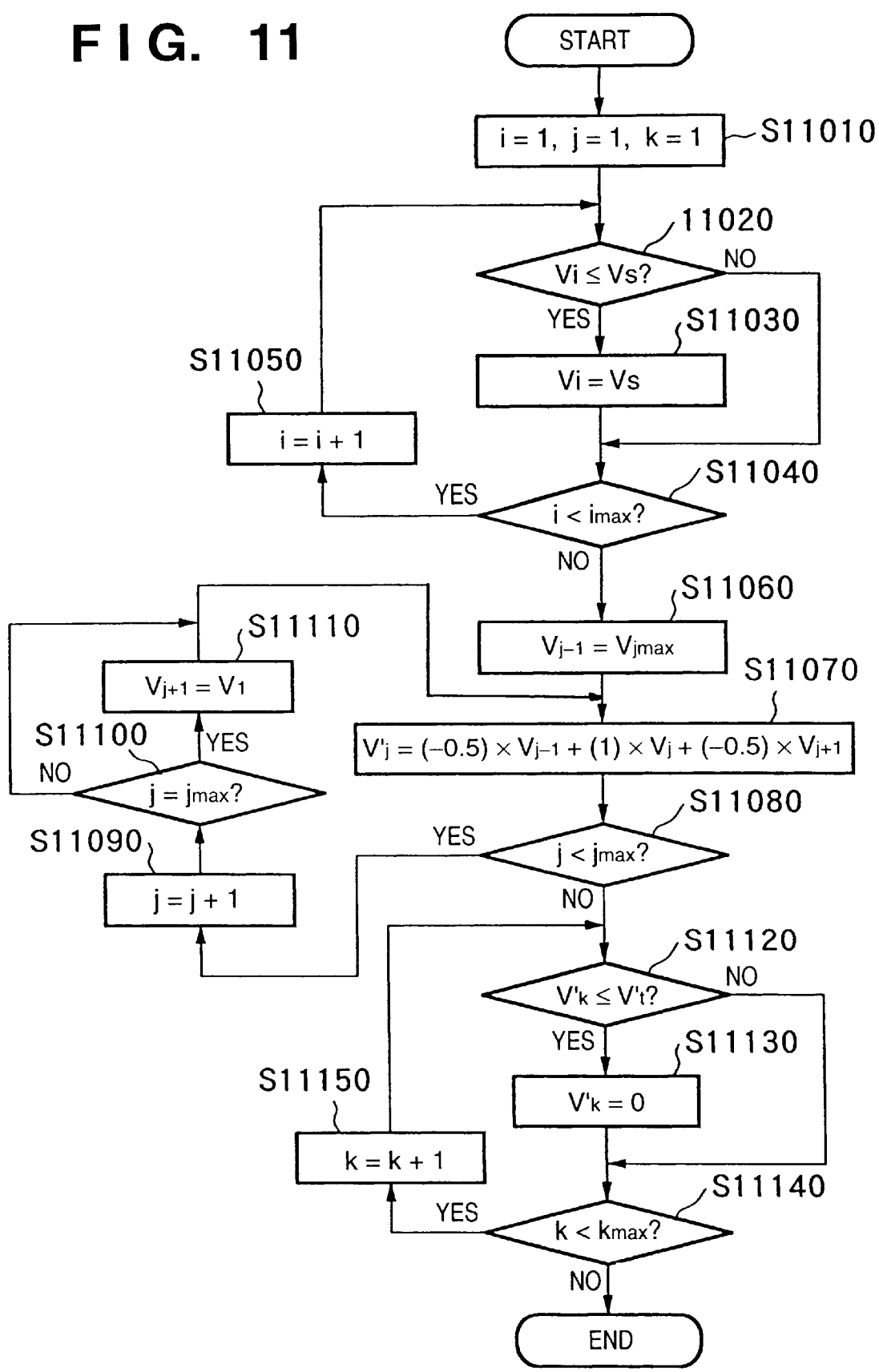
FIG. 11 is a flow chart showing the sequence of a directionality determination process in the image registration process in the embodiment of the present invention.

FIG. 11 is a flow chart showing the sequence of a directionality determination process in the image registration process in the embodiment of the present invention.

In FIG. 11, i, j, and k are index numbers given in turn to the directionality of interest in this determination process. Since this embodiment uses the four directionalities, as described above, all maximum values imax, jmax, and kmax of the index numbers are "4". $V_i$ indicates the feature amount of index number i. For example, a feature amount $V_2$ in this embodiment is that of the 45° direction.

An outline of the sequence in this discrimination process will be explained first.

In steps S11020 to S11050, if the feature amount is smaller than a predetermined value, the feature amount in that direction is corrected. In steps S11060 to S11110, a weighted sum V' of the feature amount in the j-th direction and those of the two neighboring directions (j−1, j+1) is computed (a method of computing the weighted sum V' will be explained later). In steps S11120 to S11150, if the weighted sum V' is smaller than a predetermined value, it is corrected to zero (the correction method of the weighted sum will be described later). The directionality is determined based on the obtained weighted sum V'. The individual steps will be explained in detail below.

Step S11010: The index numbers are initialized.

Steps S11020 and S11030: It is checked if the feature amount $V_i$ is equal to or smaller than a predetermined feature amount VS (step S11020). If NO ($V_i > V_s$) in step S11020, the flow jumps to step S11040; if YES ($V_i \leq V_s$) in step S11020, $V_i$ is corrected to $V_s$ (step S11030).

Note that the correction process in step S11030 is done when the feature amount Vi is sufficiently small (that is, no peak is included in a region of the i-th direction on the power spectrum of the image of interest).

If this correction is not executed, when the feature amount has a certain variation however small it may be, the weighted sum V' computed assumes a sufficiently large value. For this reason, a wrong determination result indicating that the image of interest has a directionality is finally obtained. For example, when feature amounts V are {5, 15, 3, 80}, the weighted sum V' of the feature amount V2 is 11, and it is determined that the image also has a directionality in the 45° direction.

Hence, in this embodiment, the predetermined value VS is statistically determined based on experiments for many images. Assuming that this value $V_s$ is 40, the feature amounts V of the above example are corrected to {40, 40, 40, 80}. If the feature amount is corrected to zero, when the feature amounts have a variation around the predetermined value $V_s$, for example, feature amounts {35, 42, 41, 80} are corrected to {0, 42, 41, 80}, and the weighted sum V' of V2 drastically changes from 4 to 21.5, thus seriously disturbing accurate directionality determination.

Steps S11040 and S11050: It is checked if i is smaller than imax to determine if the process is to end (step S11040). If YES (i<imax) in step S11040, i is counted up in step S11050, and the flow returns to step S11020. If NO (i≧imax) in step S11040, the flow advances to step S11060.

The method of computing the weighted sum V' will be described in detail below. A weighted sum $V'_j$ is computed by:

$$V'_j = (-0.5) \times V_{j-1} + (1) \times V_j + (-0.5) \times V_{j+1} \quad (6)$$

Note that equation (6) weights the feature amount in the j-th direction by 1, and the feature amounts in the two neighboring directions (j−1, j+1) by −0.5 in step S11070. According to equation (6), if $V_{j-1} < V_j > V_{j+1}$, $V'_j$ assumes a positive value. Of course, $V'_j$ assumes a larger value with increasing $V_j - V_{j-1}$ and $V_j - V_{j+1}$. On the other hand, if $V_{j-1} < V_j < V_{j+1}$ or $V_{-1} > V_j > V_{j+1}$, $V'_j$ assumes a negative value. That is, if a peak is included in the j-th direction, $V_j$ becomes larger than the two neighboring $V_{j-1}$ and $V_{j+1}$, and $V'_j$ assumes a positive value; otherwise, $V'_j$ assumes a negative value.

Steps S11080 to S11110: It is checked if j is smaller than jmax to determine if the process is to end (step S11080). If YES (j<jmax) in step S11080, j is counted up in step S11090 to compute weighted sums $V'_j$ for the feature amounts in all the directions. At this time, when j=jmax (i.e., j=4 and the directionality is 135°), since this embodiment pays attention to directions at 45°-intervals, j+1 is 180° (=135°+45°), which agrees with the 0° direction. Hence, if j=jmax in step S11100, $V_{j+1} = V_1$ in step S11110. Likewise, if j=1, the flow returns to step S11060 due to periodicity to set $V_{j-1} = V_{jmax}$. On the other hand, if NO (j≧jmax) in step S11080, the flow advances to step S11120.

The correction process of the weighted sum V' executed in steps S11120 to S11150 will be explained in detail below.

Even when a given directionality does not have any peak, if the feature amounts V have variations, the computed weighted sum V' assumes a positive value in some cases. In order to avoid determination errors due to such sum, this embodiment executes the following process.

Step S11120: It is checked if a weighted sum $V'_k$ is equal to or smaller than a predetermined value $V'_t$ (step S11120). If NO ($V'_k \leq V'_t$) in step S11120, the flow advances to step S11140; if YES ($V'_k \leq V'_t$), $V'_k$ is corrected to zero (step S11130). Note that $V'_t$ can be statistically obtained from experiments for many images.

Steps S11140 and S11150: It is checked if k is smaller than kmax to determine if the process is to end (step S11140). If YES (k<kmax) in step S11140, k is counted up in step S11150, and the flow returns to step S11120. On the other hand, if NO (k≧kmax) in step S11140, the directionality determination process ends.

The directionality ID that represents a direction in which the weighted sum $V'_k$ obtained in this manner assumes a positive value is assigned as that of the current image of interest. At this time, if all computed weighted sums $V'_k$ are zero, a directionality ID indicating "no directionality" is assigned, and the flow advances to step S5100 in FIG. 4.

The processes described above with reference to the flow charts in FIGS. 4 and 11 are the image registration process executed prior to a similar image search process.

Similar Image Search Process

A process for searching a plurality of types of images registered as described above for an image similar to a query image designated by the user will be explained below.

Figure 9:
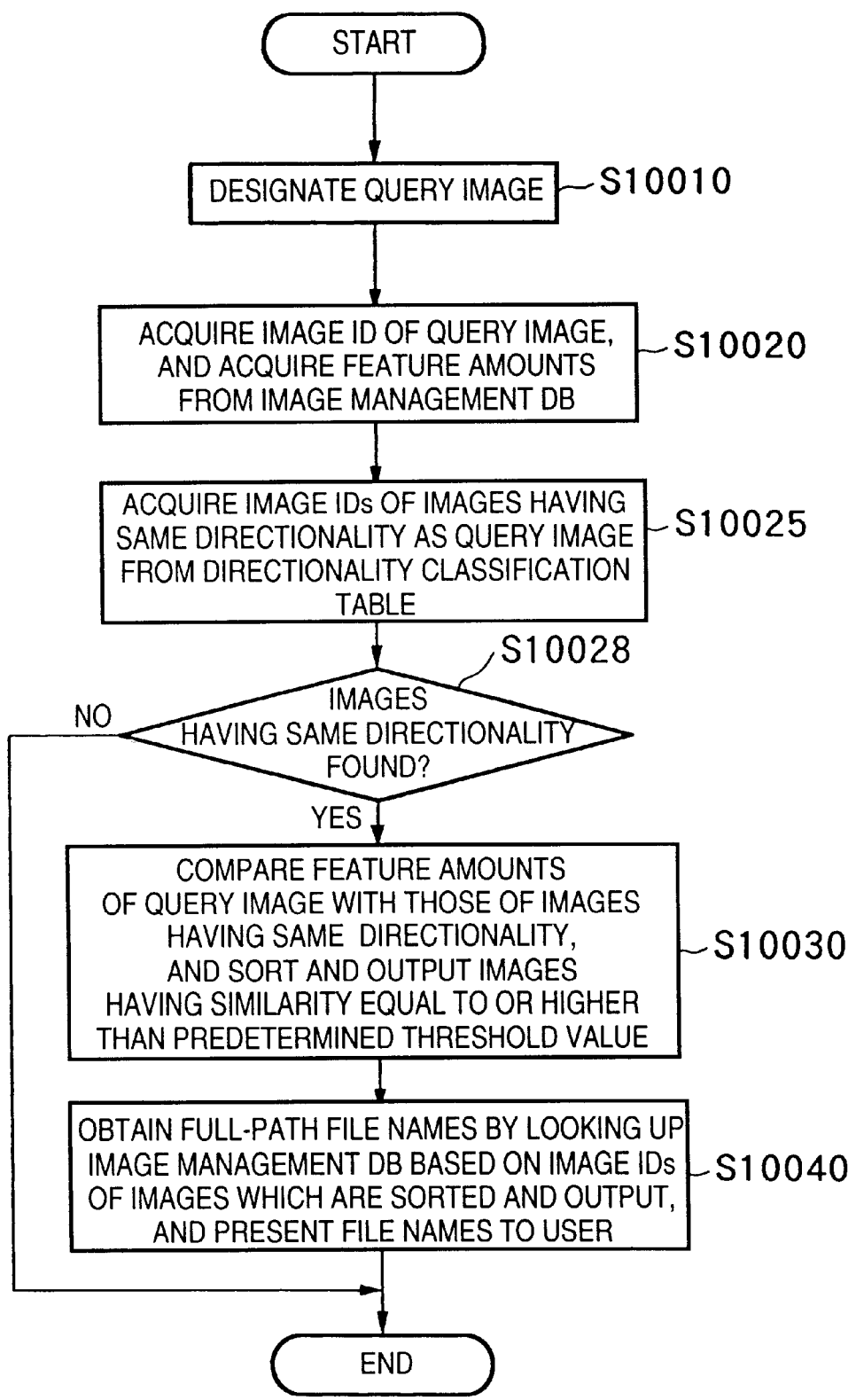
FIG. 9 is a flow chart showing the sequence of an image search process in the embodiment of the present invention.

FIG. 9 is a flow chart showing the sequence of the image search process in this embodiment, and shows the control executed by the CPU 101.

Steps S10010 and S10020 in FIG. 9: If the user designates a query image as a query for a similar image search via the user interface module 11 (step S10010), the image ID of the designated query image is acquired from the image management DB 17, and also the feature amounts (those pertaining to four directionalities in this embodiment) and directionality ID of that query image from the image management DB 17.

Step S10025: By looking up the directionality classification table shown in FIG. 10, other image IDs that belong to the directionality ID to which the image ID of the query image designated in step S10010 belongs are acquired. At this time, if the directionality ID of the query image is "no directionality", the flow immediately advances to the next step without looking up the directionality classification table. On the other hand, if the query image has a plurality of directionality IDs, i.e., if the query image has directionality IDs "0°" and "90°" in the example of the directionality classification table shown in FIG. 10, both image IDs {1, 4, 5, 10} whose directionality ID belongs to 0° and image IDs {3, 4, 10} whose directionality ID belongs to 90° are acquired.

If only images (image IDs) having the same directionalities as those of the query image are to be retrieved, the two sets of image IDs can be ANDed. Therefore, in this case, image IDs {4, 10} are obtained.

On the other hand, if the user wants to search images, the directionality IDs of which match at least one of those of the query image, the two sets of image IDs can be ORed. Therefore, at this time, image IDs {1, 3, 4, 5, 10} are obtained.

Step S10028: It is checked if images having the same directionality are found in step S10026. If NO (not found) in step S10028, the process is aborted, and a message indicating that no images are found is presented to the user; if YES (found) in step S10028, the flow advances to step S10030.

Step S10030: By comparing the feature amounts in the four directionalities of the query image with those of each of the images having the same directionality as that of the query image, which are obtained in step S1025, a similarity R between these images is computed. Note that the feature amounts of images having the same directionality can be acquired by looking up the image management DB 17 using their image IDs as a key.

Let A be the query image, B be a test image (an image to be compared), H000 be the feature amount in the 0° directionality of these images, H045 be the feature amount in the 45° directionality, H090 be the feature amount in the 90° directionality, and H135 be the feature amount in the 135° directionality. Then, the similarity R can be computed from equation (7) of an inner product that considers the feature amounts of the respective images as four-dimensional vectors:

$$(\text{Similarity } R) = (H000_A \times H000_B + H045_A \times H045_B + H090_A \times H090_B + H135_A \times H135_B) \div \left( \sqrt{(H000_A)^2 + (H045_A)^2 + (H090_A)^2 + (H135_A)^2} \times \sqrt{(H000_B)^2 + (H045_B)^2 + (H090_B)^2 + (H135_B)^2} \right) \quad (7)$$

Images B whose similarities R obtained by equation (7) are equal to or larger than a predetermined threshold value are sorted in descending order of similarity R, and the computed similarities R and the image IDs of images B are output as the sort result.

Step S10040: By looking up the image management DB 17 using the image IDs of images B included in the sort output in step S10030 as a key, the file names of the full-paths of images B are acquired, and are presented to the user on the display 107.

The process that has been explained with reference to the flow chart in FIG. 9 is the similar image search process.

The processing sequence of the image search apparatus according to the aforementioned embodiment will be summarized below. A two-dimensional power spectrum obtained by computing the two-dimensional Fourier transform of an input image is segmented into 5×5 blocks on the two-dimensional coordinate system. The standard deviation of power spectrum components is computed for each of 5×3 blocks of these segmented blocks. The computed standard deviations in units of blocks (a matrix of standard deviations) undergo masking using predetermined mask patterns which are prepared in advance in units of directions to be recognized, and the sums of the standard deviations are computed as feature amounts in units of these directions. The directionality of the input image is determined in accordance with the feature amounts. Furthermore, the feature amounts computed for the input image and the directionality determination result are stored in correspondence with each other, and a similar image is searched for using the stored information.

More specifically, feature amounts indicating the directionalities of a texture image are computed in correspondence with the four directionalities of interest, and a similarity R between a query image and another image is computed using these feature amounts, thus implementing the image search apparatus.

Of the four directions of interest, the directionality of a texture image can be classified on the basis of the feature amounts computed for that image, as in the directionality classification table (FIG. 10). Using the classified information, a narrow-down process of image candidate upon similar image search is done using the classified information, thus implementing a high-speed search process.

In this embodiment, four directions are set, and a texture image having three or more directionalities can be classified. When the power spectrum is segmented into more than 5×5 blocks, texture images can be classified in association with more directionalities.

Modification of Embodiment

In the above embodiment, an edge extraction process is done using a Sobel operator to emphasize the peak of the power spectrum. Alternatively, the peak may be emphasized by executing an edge extraction process by other methods using, e.g., a Roberts operator.

In the above embodiment, the reason why the edge extraction process is done to emphasize the peak of the power spectrum is to assure high search precision by strongly reflecting the peak in the feature amounts computed by the process later. If the feature amount precision can be sacrificed more or less to improve the processing speed, the edge extraction process can be omitted.

In the above embodiment, when four directionalities are taken into consideration, the power spectrum is segmented into 5×5 blocks, but may be segmented into more than 5×5 blocks if a lower processing speed suffices.

In the above embodiment, four directionalities are considered. Alternatively, the feature amounts can be computed in correspondence with more directionalities by adjusting the number of segmented blocks and mask patterns.

In the above embodiment, the standard deviations of blocks corresponding to the first and second quadrants are computed in consideration of symmetry of the power spectrum. Alternatively, all blocks as well as the third and fourth quadrants may undergo computations if a lower processing speed suffices.

In the above embodiment, the mask patterns shown in FIGS. 6A to 6D are used. Also, various variations of mask patterns (e.g., to increase weight values) are available. With these mask patterns, the object of the resent invention can also be achieved as long as they are satisfactorily tuned.

In the above embodiment, the weights used upon computing the weighted sum in the image feature determination module are set at −0.5, 1, and −0.5. Also, various variations of weights (e.g., −0.4, 0.8, and −0.4, and so forth) are available.

Another Embodiment

Note that the present invention may be applied to either a system constituted by a plurality of devices (e.g., a host computer, an interface device, a reader, a printer, and the like), or an apparatus consisting of a single equipment.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the flow charts shown in FIGS. 4, 9, and 11 mentioned above.

To recapitulate, according to the aforementioned embodiment and its modification, an image search apparatus and method which accurately search for a desired image with high precision within a practical required time, and a computer readable storage medium can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image search apparatus comprising:
    input means for inputting an image;
    power spectrum computation means for computing a two-dimensional power spectrum of the inputted image by computing a two-dimensional Fourier transform of the inputted image;
    standard deviation matrix generation means for segmenting the two-dimensional power spectrum computed by said power spectrum computation means into a plurality of blocks on a two-dimensional coordinate system, computing standard deviations of power spectrum components in units of blocks, and generating a matrix of the generated standard deviations;
    feature amount computation means for computing sums of the standard deviations as feature amounts in units of directions by making the matrix generated by said standard deviation matrix generation means using predetermined mask patterns which are prepared in advance in units of directions of interest and correspond to a pattern of the matrix;
    feature determination means for determining a directionality of the inputted image on the basis of the feature amounts computed by said feature amount computation means;
    storage means for classifying and storing the inputted image and the feature amounts computed by said feature amount computation means on the basis of the directionality determination result of said feature determination means; and
    image search means for searching for a similar image to that of the inputted image in said storage means on the basis of the feature amounts and determination result stored in said storage means.

2. The apparatus according to claim 1, wherein said power spectrum computation means includes edge extraction means for emphasizing a peak included in the two-dimensional power spectrum by considering the computed two-dimensional power spectrum as a new image, and executing edge extraction for the image.

3. The apparatus according to claim 1, wherein said standard deviation matrix generation means generates the matrix of the standard deviations for blocks corresponding to first and second quadrants of the two-dimensional coordinate system of the plurality of segmented blocks.

4. The apparatus according to claim 1, wherein the mask patterns in units of directions of interest are multi-valued masks which are weighted to have the directions of interest thereof as peaks.

5. The apparatus according to claim 1, wherein in each of the mask patterns in units of directions of interest, zero is set at a position where a large standard deviation is always generated irrespective of a directionality of the inputted image by masking corresponding to the pattern of the matrix.

6. The apparatus according to claim 1, wherein said feature determination means includes correction means for correcting the feature amount computed by said feature amount computation means to another predetermined value so as to ignore it when the feature amount is smaller than a predetermined value.

7. The apparatus according to claim 1, wherein said feature determination means determines a directionality of the image by computing a weighted sum of a feature amount in a given direction of the plurality of directions of interest, and feature amounts in two neighboring directions.

8. The apparatus according to claim 7, wherein when a computed weighted sum is smaller than a predetermined value, said feature determination means corrects the weighted sum to zero, and determines that the image does not have any specific directionality.

9. The apparatus according to claim 1, wherein, when a query image designated as a query is stored in a plurality of classifications in said storage means to have directionalities in a plurality of directions, said image search means computes an AND logical operation on all other images belonging to these classifications to narrow them down to images similar to the query image.

10. The apparatus according to claim 1, wherein, when a query image designated as a query is stored in a plurality of classifications in said storage means to have directionalities in a plurality of directions, said image search means computes an OR logical operation on all other images belonging to these classifications to narrow them down to images similar to the query image.

11. The apparatus according to claim 1, wherein said image search means computes a similarity between a query image designated as a query and another image by considering, as vectors, feature amounts which are stored in said storage means in correspondence with the query image and the other image as a similar image candidate, and are computed in units of directions of interest, and computing an inner product of the vectors.

12. A computer readable storage medium storing a program code that makes a computer operate as an image search apparatus according to the apparatus of claim 1.

13. An image search method comprising:
    an input step, of inputting an image;
    a power spectrum computation step, of computing a two-dimensional power spectrum of the inputted image by computing a two-dimensional Fourier transform of the inputted image;

a standard deviation matrix generation step, of segmenting the two-dimensional power spectrum computed in said power spectrum computation step into a plurality of blocks on a two-dimensional coordinate system, computing standard deviations of power spectrum components in units of blocks, and generating a matrix of the generated standard deviations;

a feature amount computation step, of computing sums of the standard deviations as feature amounts in units of directions by making the matrix generated in said standard deviation matrix generation step using predetermined mask patterns which are prepared in advance in units of directions of interest and correspond to a pattern of the matrix;

a feature determination step, of determining a directionality of the inputted image on the basis of the feature amounts computed in said feature amount computation step;

a storage step, of classifying and storing the inputted image and the feature amounts computed in said feature amount computation step on the basis of the directionality determination result in the feature determination step; and an image search step, of searching for a similar image to that of the inputted image in said storage step on the basis of the feature amounts and determination result stored in said storage step.

14. The method according to claim 13, wherein said power spectrum computation step includes the step of emphasizing a peak included in the two-dimensional power spectrum by considering the computed two-dimensional power spectrum as a new image, and executing edge extraction for the image.

15. The method according to claim 13, wherein said standard deviation matrix generation step includes the step of generating the matrix of the standard deviations for blocks corresponding to first and second quadrants of the two-dimensional coordinate system of the plurality of segmented blocks.

16. The method according to claim 13, wherein the mask patterns in units of directions of interest are multi-valued masks which are weighted to have the directions of interest thereof as peaks.

17. The method according to claim 13, wherein in each of the mask patterns in units of directions of interest, zero is set at a position where a large standard deviation is always generated irrespective of a directionality of the inputted image by masking corresponding to the pattern of the matrix.

18. The method according to claim 13, wherein said feature determination step includes the step of correcting the feature amount computed in said feature amount computation step to another predetermined value so as to ignore it when the feature amount is smaller than a predetermined value.

19. The method according to claim 13, wherein said feature determination step includes the step of determining a directionality of the image by computing a weighted sum of a feature amount in a given direction of the plurality of directions of interest, and feature amounts in two neighboring directions.

20. The method according to claim 19, wherein said feature determination step includes the step of correcting a weighted sum to zero when the computed weighted sum is smaller than a predetermined value, and determining that the image does not have any specific directionality.

21. The method according to claim 13, wherein, when a query image designated as a query is stored in a plurality of classifications in said storage step to have directionalities in a plurality of directions, an AND logical operation on all other images belonging to these classifications is computed in said image search step to narrow them down to images similar to the query image.

22. The method according to claim 13, wherein, when a query image designated as a query is stored in a plurality of classifications in said storage step to have directionalities in a plurality of directions, an OR logical operation on all other images belonging to these classifications is computed in said image search step to narrow them down to images similar to the query image.

23. The method according to claim 13, wherein said image search step includes the step of computing a similarity between a query image designated as a query and another image by considering, as vectors, feature amounts which are stored in said storage step in correspondence with the query image and the other image as a similar image candidate, and are computed in units of directions of interest, and computing an inner product of the vectors.

24. A computer readable storage medium storing a program code that allow a computer to execute an image search method according to the method of claim 12.

* * * * *

UNITED STATES PATENT AND TRADEMARK OFFICE
CERTIFICATE OF CORRECTION

PATENT NO.    : 6,647,157 B1
DATED         : November 11, 2003
INVENTOR(S)   : Hirotaka Shiyama et al.

It is certified that error appears in the above-identified patent and that said Letters Patent is hereby corrected as shown below:

<u>Title page,</u>
Item [56], References Cited, OTHER PUBLICATIONS, "R. Boacsy," should read -- R. Bajcsy --.

<u>Column 1,</u>
Line 16, "description" should read -- Description -- ; and
Lines 35 and 60, "description))" should read -- description)). --.

<u>Column 9,</u>
Line 26, "VS" should read -- $V_S$ --; and
Line 52, "$V_{-1} > V_j > V_{j+1}$" should read -- $V_{j-1} > V_j > V_{j+1}$, --

<u>Column 11,</u>
Lines 24-29, "
$$(Similarity\ R) = (H000_A + H000_B + H045_A \times H045_B + H090_A + H090_B + H135_A \times H135_B) + \left( \sqrt{(H000_A)^2 + (H045_A)^2 + (H090_A)^2 + (H135_A)^2} \times \sqrt{(H000_B)^2 + (H045_B)^2 + (H090_B)^2 + (H135_B)^2} \right) \quad (7)$$
"

should read
$$-- (Similarity\ R) = (H000_A + H000_B + H045_A + H045_B + H090_A + H090_B + H135_A \times H135_B) \div \left( \sqrt{(H000_A)^2 + (H045_A)^2 + (H090_A)^2 + (H135_A)^2} \times \sqrt{(H000_B)^2 + (H045_B)^2 + (H090_B)^2 + (H135_B)^2} \right) \quad (7) --.$$

Line 55, "and-the" should read -- and the --.

UNITED STATES PATENT AND TRADEMARK OFFICE
CERTIFICATE OF CORRECTION

PATENT NO. : 6,647,157 B1
DATED : November 11, 2003
INVENTOR(S) : Hirotaka Shiyama et al.

It is certified that error appears in the above-identified patent and that said Letters Patent is hereby corrected as shown below:

<u>Column 16,</u>
Line 43, "allow" should read -- allows --.

Signed and Sealed this

Sixth Day of July, 2004

JON W. DUDAS
*Acting Director of the United States Patent and Trademark Office*